United States Patent
Baumann (10) Patent No.: US 7,500,221 B2
(45) Date of Patent: Mar. 3, 2009

(54) FILTER-BASED COMMENTS IN SOURCE CODE

(75) Inventor: Ralf Baumann, Rauenberg (DE)

(73) Assignee: SAP AG, Walldorf (DE)

( * ) Notice: Subject to any disclaimer, the term of this patent is extended or adjusted under 35 U.S.C. 154(b) by 828 days.

(21) Appl. No.: 10/821,825

(22) Filed: Apr. 8, 2004

(65) Prior Publication Data

US 2005/0229156 A1     Oct. 13, 2005

(51) Int. Cl.
G06F 9/44 (2006.01)
G06F 17/00 (2006.01)

(52) U.S. Cl. ................. 717/110; 715/206; 715/230; 715/233

(58) Field of Classification Search ............ 717/112, 717/141–159, 120–122, 110; 713/161, 166, 713/176, 151; 715/206, 230, 233
See application file for complete search history.

(56) References Cited

U.S. PATENT DOCUMENTS

| | | | | |
|---|---|---|---|---|
| 5,513,305 | A * | 4/1996 | Maghbouleh ............. | 715/500 |
| 5,586,329 | A * | 12/1996 | Knudsen et al. ........... | 717/108 |
| 5,761,683 | A * | 6/1998 | Logan et al. .............. | 715/206 |
| 5,802,299 | A * | 9/1998 | Logan et al. .............. | 709/218 |
| 5,826,025 | A * | 10/1998 | Gramlich ................. | 709/217 |
| 5,857,212 | A | 1/1999 | Van De Vanter | |
| 5,956,708 | A * | 9/1999 | Dyko et al. ............... | 707/3 |
| 6,295,542 | B1* | 9/2001 | Corbin .................... | 715/205 |
| 6,427,234 | B1* | 7/2002 | Chambers et al. ......... | 717/140 |
| 6,574,792 | B1 | 6/2003 | Easton | |
| 6,802,059 | B1* | 10/2004 | Lyapustina et al. ........ | 717/143 |
| 6,865,713 | B1* | 3/2005 | Bates et al. ............... | 715/233 |
| 6,874,140 | B1* | 3/2005 | Shupak ................... | 717/131 |
| 6,978,443 | B2* | 12/2005 | Flanagan et al. ........... | 717/127 |
| 7,146,565 | B2* | 12/2006 | Toyama et al. ............. | 715/239 |
| 7,155,705 | B1* | 12/2006 | Hershberg et al. ......... | 717/137 |

(Continued)

FOREIGN PATENT DOCUMENTS

EP     0 413 486 A2     2/1991

OTHER PUBLICATIONS

"The Pan Language-Based Editing System", Robert A. Balance et al, ACM 1992.. pp. 95-127.*

(Continued)

*Primary Examiner*—Wei Y Zhen
*Assistant Examiner*—Chih-Ching Chow
(74) *Attorney, Agent, or Firm*—Finnegan, Henderson, Farabow, Garrett & Dunner LLP (57) ABSTRACT

The invention relates to computer-implemented methods and systems for providing comments within source code. For providing access management to the comments, in one aspect, the comments are stored separately from the source code, the comments are retrieved from the storage medium, and the retrieved comments are displayed with the source code. In certain aspects, filter information may be stored with one or more comments and the comments may be provided based on filter information. The filter information may be used to block a requesting user from having access to certain comments. Access authorization information may also be used to control access to the comment information.

38 Claims, 3 Drawing Sheets

U.S. PATENT DOCUMENTS

| | | | |
|---|---|---|---|
| 7,194,679 B1 * | 3/2007 | Green | 715/233 |
| 7,222,333 B1 * | 5/2007 | Mor et al. | 717/115 |
| 7,231,633 B2 * | 6/2007 | Grassens | 717/124 |
| 7,281,237 B2 * | 10/2007 | de Jong | 717/126 |
| 2002/0019839 A1 | 2/2002 | Shiu | |
| 2003/0145282 A1 * | 7/2003 | Thomas et al. | 715/513 |
| 2003/0163801 A1 | 8/2003 | Thames et al. | |
| 2004/0111701 A1 * | 6/2004 | Beust | 717/108 |
| 2005/0005168 A1 * | 1/2005 | Dick | 713/201 |
| 2006/0047639 A1 * | 3/2006 | King et al. | 707/3 |

OTHER PUBLICATIONS

Web Management with Visual SourceSafe 5.0, 1997, pp. 1-99.*

Leland, Mary, D.P., et al., "Collaborative Document Production Using Quilt," Bell Communications Research, Inc., ACM, 1988, pp. 206-215.

Lougher, Robert, et al., "Group Support for the Recording and Sharing of Maintenance Rationale," Software Engineering Journal, Nov. 1993, pp. 295-306.

* cited by examiner

FILTER-BASED COMMENTS IN SOURCE CODE

FIELD OF THE INVENTION

The present invention relates to methods and systems for providing comments within source code.

BACKGROUND OF THE INVENTION

In current source code compilers and editors, it is possible to insert comments into source code. These comments provide programmers with information about the particular part of the source code, e.g., what the initial intention of a particular part of source code was, and what it does. Also, comments allow programmers to include certain remarks and thoughts in the source code, by which they are able to reconstruct their initial thoughts during programming. Further, comments allow including version information as well as other information.

One drawback of these comments is that they are in plain text within the source code. Every change within the comments results in a change of the source code. If the source code is delivered to customers, they are able to read the comments within the source code. Often, these comments are not intended for the public.

Also, comments are mostly written in the language of the programmer. However, companies that operate internationally often assign programming tasks to more than one programming team and the members of the programming teams may reside in different countries. Therefore, comments within the source code associated with a single project may be in several different languages. In cases such as these, programmers from one country might not be able to read the comments of programmers from another country unless all comments within the source code are translated into one common language or all comments are translated into all of the languages spoken by the team members. Translating all comments into different languages not only is time-consuming but often results in different versions of source code which, in turn, increases the probability of version conflicts and other incompatibilities.

SUMMARY OF THE INVENTION

The present invention provides a computer-implemented method for associating comments with source code, the method comprising, storing the comments separately from the source code, and, identifying where each of the comments is associated with the source code.

According to certain embodiments, the comments are stored separately from the source code, the comments are retrieved from their storage medium, and the retrieved comments are included into the source code. The separation of the storage of the comments from the storage of the source code may exist on any level such as, for instance, a physical level (e.g., different media) or an electronic level (e.g., same media, different folders, files, or portions within a file).

By storing the comments separately from the source code, access to the comments may be controlled. Storing the comments separately from the source code results in providing the source code without comments at first. One advantage of this may be that users of the source code, e.g., customers, do not see directly which comments are included within the source code.

The comments, once stored separately, may be manipulated without manipulating the source code. For presenting the comments together with the source code, the comments are retrieved from their storage medium. As the comments are associated with the source code, it may be identified where each of the comments is associated within the source code. After retrieval, these comments may be included into the source code. The source code editor programs may then present the source code together with the comments. By the association of comments and source code, the position of the comments in the source code may be defined. The comment may be positioned correctly within the source code.

To allow management of comments, in particular access management, embodiments of the present invention provide the comments within the source code based on filter information. The filter information defines which comments are included within the source code for certain users. Filter information may also be used to define which comments are retrieved and/or presented within the source code.

To provide filtering of the comments during retrieval, embodiments of the present invention may assign the filter information to the comments. During the creation of the comments, certain filter information may be stored with each comment or each group of comments. During retrieval of the comments, this filter information is checked. If the filter information allows access to the comments for the requesting user, the comments may be provided. The filter information thus allows an embodiment to block a requesting user from having access to certain comments.

To allow individual access to the comments, in particular for different users or user groups, certain embodiments of the present invention transmit access authorisation information to the storage medium when accessing the comments. The access authorisation information is compared with the filter information assigned to the comments, and the comments are only provided if the filter information matches the access authorisation information. The access authorisation information may comprise information about a user, a user group, a source code version, a source code language or any other information, which may be used for defining access authorisation to the source code. This information is transmitted to the storage medium, where it is analysed. During analysis of this information, the authorisation information is compared with the filter information assigned to the comments. For each comment, filter information may be stored, whereby access to the particular comment may be managed. In the event that the current access authorisation information matches the filter information, e.g. the filter information defines access permission for this particular comment, the comment is provided. Otherwise, accessing the comment may be blocked. Hence, access to the comments may be managed within the storage medium, e.g. a database, of the comments. The editing means for editing the comments do not comprise the comments themselves, the comments are rather stored separately, and access to the comments is managed separately from the source code.

In certain embodiments of the present invention, when retrieving the comments from the storage medium, the access authorisation information has to be provided. Therefore, in this scenario, access authorisation information is retrieved prior to retrieving the comments from the storage medium, the access authorisation information determining whether the comments may be accessed. This retrieval of access authorisation information may be carried out, for instance, by prompting a user for a user account and a user password, determining user role, analysing source code version, retrieving language information, or any other information suitable for managing the access to the comments. After the access authorisation information is retrieved, this access authorisation information may be transmitted to the storage medium and access management may be executed there.

To enable easy access to the comments, certain embodiments of the present invention include links providing storage information of the stored comments within the source code. The links may comprise file names, directory information, path information, database queries or any other appropriate information for retrieving data from a storage medium. These links may be read by editing means and used for retrieving the comments from the storage medium.

Assigning filter information to the links for filtering the comments allows access management within the editing means, insofar as filter information is already stored within the source code, e.g., together with the links. This filter information may be used to define whether a link may be used or not.

To provide access management to the links, certain embodiments of the present invention may compare access authorisation information with the filter information assigned to the links when accessing the links and only use the links for retrieving the comments if the filter information matches the access authorisation information. Access authorisation information may be the same as defined above. A link might only be accessible if the access authorisation information matches access information defined in the filter information.

To allow flexible access management, certain embodiments of the present invention may retrieve access authorisation information prior to reading the links for retrieving the comments from the storage medium, the access authorisation information determining whether the links may be used when accessing the comments. By retrieving the access authorisation information prior to reading the links, access authorisation may already be determined when reading the links. The retrieval of access authorisation information may be done as defined above. In that case, access management is already carried out within the editor program. Access to the storage medium of the comments thus may only be executed if access is permitted within the editor program. Otherwise, no comments may be requested from the storage medium.

During source code coding, comments may usually be provided for different elements of the source code. For example, comments may be provided for certain lines, procedures, methods, classes or objects within the source code. The comment may explain, for example, the purpose or function of the preceding or following section of code. Therefore, certain embodiments of the present invention assign the links to particular elements of the source code.

For programmers, it is helpful to see comments within the source code. However, the programmers may not always want to see the links, as the links only provide the storage information about the comments. Instead, the information needed by the programmers or by the customers is included within the comments. Therefore, certain embodiments of the present invention display the comments within the source code by replacing the links in the source code with the respective comments.

To provide a higher degree of security, and to avoid manipulating links, certain embodiments of the present invention may retrieve access authorisation information prior to reading the links, the access authorisation information determining whether the link is displayed with the source code or not. That means that links may only be displayed for particular users or user groups, and only these users or user groups may be allowed to manipulate the links. All other users may be excluded to see the links at all. These users may see the appropriate comment or do not see anything at all.

To provide different comments for different users, user groups, source code versions, or language versions, certain embodiments of the present invention may store more than one comment assigned to a particular element of the source code within the database. In that case, for each piece of source code, different comments may be provided. These comments may be customized for the particular user groups viewing this comment. A programmer needs different information than a customer. Therefore, comments for programmers, as well as comments for customers may be stored within the database, and presented accordingly. It is also possible, to include personal comments, which may only be seen by the particular programmer or user.

To provide easy storage of the comments, and thus allow use of generic database programs, certain embodiments of the present invention retrieve all comments when displaying the source code, and the comments are suppressed or presented within the source code according to the filter information. In that case, the filtering of the comments is only executed within the source code editor. All comments are first retrieved from the database. Afterwards, it is decided whether or not a comment is presented.

To provide easy access to the comments, certain embodiments of the present invention may store the comments within a database. The database may allow storing comments in common format, and accessing these comments using generic database queries.

To provide comments in different languages, certain embodiments of the present invention may store language dependent comments within the database, retrieve the language information, and present the language dependent comments according to the language information. The language information may be used as filter information, allowing an embodiment to provide language-customized comments. In particular, when programming in teams in different countries, this particular embodiment may be preferable. Also, when distributing software to different countries, customers might want to see comments intended for them in their language. Furthermore, it is possible to translate the comments within the database without touching the source code, allowing the source code to remain unchanged. A translator may only need to access the database and to translate all comments within the database into the appropriate language. Each comment in each language is stored within the database. Also, filter information, defining which language the comment is assigned to, may be stored. When accessing the comments, the appropriate language version of this comment may be retrieved using the filter information.

Filter information may also include, for example, a user role, a user group and/or a source code version. The filter information would specify, for instance, which user role(s), which user group(s), and/or which source code version(s) are permitted to access the comment corresponding to the given filter information. All this information may be used for determining, whether a comment is presented or not.

A further aspect of the invention is a computer-implemented method for providing comments within source code wherein the comments are stored separately from the source code, links providing storage information of the stored comments are comprised within the source code, the comments are retrieved from the database using the storage information from the links, and the retrieved comments are included into the source code.

A further aspect of the invention is a computer-implemented method for providing comments within source code wherein the comments are stored separately from the source code, links providing storage information of the stored comments are comprised within the source code, access authorisation information determining filter information for filtering the comments is used for retrieving the comments, the comments are retrieved from the database according to the filter information using the storage information from the links, and the retrieved comments are included into the source code.

Another aspect of the invention is a computer program for associating comments with source code, the program comprising instructions operable to cause a processor to store the comments separately from the source code; and to identify where each of the comments is associated with the source code.

The program may further comprise instructions operable to cause a processor to send request information for retrieving the comments from a storage medium, receive the comments from the storage medium and present the received comment within the source code.

Yet, a further aspect of the invention is a computer program product with a computer program stored thereon for associating comments with source code, the program comprising instructions operable to cause a processor to store the comments separately from the source code, and to identify where each of the comments is associated with the source code.

The stored computer program may cause a processor to send request information for retrieving the comments from a storage medium, receive the comments from the storage medium, and present the received comments within the source code.

Another aspect of the invention is a computer system installed to provide comments within source code comprising a first storage storing the source code, a second storage storing the comments, the second storage being separate from the first storage, a computer in communication with the first storage and the second storage, and, a computer program having instructions operable to cause a processor to store the comments separately from the source code, and to identify where each of the comments is associated with the source code.

The computer system may include storage means for storing the comments, receiving means for receiving the request for comments from the editing computer, processing means for processing the request for comments and for retrieving the requested comments, and transmission means for transmitting the retrieved comments to the editing computer.

Further advantages may be derived from the dependent claims. Referring now to the drawings, in which like numerals represent like elements throughout the several Figures, aspects of the invention and the exemplary operating environment will be described.

BRIEF DESCRIPTION OF THE DRAWINGS

The accompanying drawings, which are incorporated in and constitute a part of this specification, illustrate various embodiments of the invention and, together with the description, serve to explain the principles of the invention. In the drawings.

DETAILED DESCRIPTION

The present invention may be implemented by computers within a computer network. An example is illustrated in connection with FIG. 1.

Figure 1:
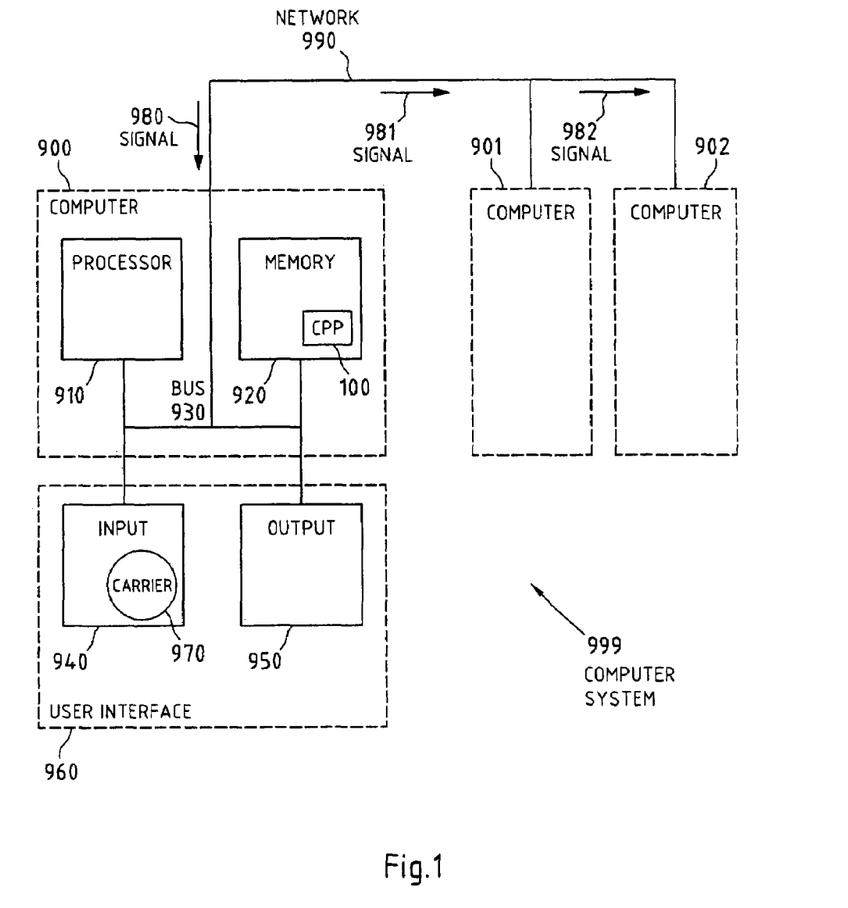
FIG. 1 illustrates an exemplary computer system used to implement one or more embodiments of the present invention.

FIG. 1 illustrates a simplified block diagram of exemplary computer system 999 having a plurality of computers 900, 901, 902 (or even more).

Computer 900 can communicate with computers 901 and 902 over network 990. Computer 900 has processor 910, memory 920, bus 930, and, optionally, input device 940 and output device 950 (I/O devices, user interface 960). As illustrated, the invention is implemented by computer program product 100 (CPP), carrier 970 and signal 980.

In respect to computer 900, computer 901/902 is sometimes referred to as a "remote computer." Computer 901/902 may be, for example, a server, a peer device or other common network node, and typically has many or all of the elements described relative to computer 900.

Computer 900 may be, for example, a conventional personal computer (PC), a desktop device or a hand-held device, a multiprocessor computer, a pen computer, a microprocessor-based or programmable consumer electronics device, a minicomputer, a mainframe computer, a personal mobile computing device, a mobile phone, a portable or stationary personal computer, a palmtop computer or the like.

Processor 910 may be, for example, a central processing unit (CPU), a micro-controller unit (MCU), digital signal processor (DSP), or the like.

Memory 920 may be any element or elements that temporarily or permanently store data and instructions. Although memory 920 is illustrated as part of computer 900, memory can also be implemented in network 990, in computers 901/902 and in processor 910 itself (e.g., cache, register), or elsewhere. Memory 920 can be a read only memory (ROM), a random access memory (RAM), or a memory with other access options. Memory 920 may be physically implemented by computer-readable media, for example: (a) magnetic media, like a hard disk, a floppy disk, or other magnetic disk, a tape, a cassette tape; (b) optical media, like optical disk (CD-ROM, digital versatile disk—DVD); or (c) semiconductor media, like DRAM, SRAM, EPROM, EEPROM, memory stick.

Optionally, memory 920 may be distributed. Furthermore, portions of memory 920 can be removable or non-removable. For reading from media and for writing in media, computer 900 uses well-known devices, such as disk drives or tape drives.

Memory 920 stores modules such as, for example, a basic input output system (BIOS), an operating system (OS), a program library, a compiler, an interpreter, and a text-processing tool. Modules are commercially available and can be installed on computer 900. For simplicity, these modules are not illustrated.

CPP 100 has program instructions and, optionally, data that cause processor 910 to execute method steps of the present invention. In other words, CPP 100 can control the operation of computer 900 and its interaction in network system 999 so that it operates to perform in accordance with the invention. For example and without the intention to be limiting, CPP 100 can be available as source code in any programming language, and as object code ("binary code") in a compiled form.

Although CPP 100 is illustrated as being stored in memory 920, CPP 100 can be located elsewhere. CPP 100 can also be embodied in carrier 970.

In FIG. 1, carrier 970 is illustrated as being outside computer 900. For communicating CPP 100 to computer 900, carrier 970 may be located in input device 940. Carrier 970 may be any computer-readable medium, such as a medium explained above (cf. memory 920). Generally, carrier 970 may be an article of manufacture having a computer-readable medium with computer-readable program code to cause the computer to perform methods of the present invention. Further, signal 980 can also embody computer program product 100.

For the sake of convenience, CPP 100, carrier 970, and signal 980 have been described in connection with computer 900. Optionally, further carriers and further signals may embody further computer program products (CPP) to be executed by further processors in computers 901 and 902.

Input device 940 provides data and instructions for processing by computer 900. Device 940 may, for instance, be a keyboard, a pointing device (e.g., mouse, trackball, cursor direction keys), microphone, joystick, game pad, scanner, or disc drive. Although these examples are devices with human interaction, device 940 can also be a device without human interaction, for example, a wireless receiver (e.g., with satellite dish or terrestrial antenna), a sensor (e.g., a thermometer), or a counter (e.g., a goods counter in a factory). Input device 940 can serve to read carrier 970.

Output device 950 presents instructions and data that have been processed. For example, this can be a monitor or a display, (cathode ray tube (CRT), flat panel display, liquid crystal display (LCD), speaker, printer, plotter, or vibration alert device. Output device 950 can communicate with the user, but it can also communicate with further computers.

Input device 940 and output device 950 can be combined to a single device. Any device 940 and 950 can be provided optional.

Bus 930 and network 990 may provide logical and physical connections by conveying instruction and data signals. For the sake of convenience, connections inside computer 900 are referred to as "bus 930", while connections between computers 900-902 are referred to as "network 990". Optionally, network 990 includes gateways, which are computers that specialize in data transmission and protocol conversion.

Devices 940 and 950 are coupled to computer 900 by bus 930 (as illustrated) or by network 990 (optional). While the signals inside computer 900 are typically electrical signals, the signals in network may be electrical, electromagnetic, optical or wireless (radio) signals.

Networks are commonplace in offices, enterprise-wide computer networks, intranets and the Internet (e.g., world wide web WWW). Network 990 can be a wired or a wireless network. To name a few network implementations, network 990 can be, for example, a local area network (LAN), a wide area network (WAN), a public switched telephone network (PSTN); a Integrated Services Digital Network (ISDN), an infra-red (IR) link, a radio link, like Universal Mobile Telecommunications System (UMTS), Global System for Mobile Communication (GSM), Code Division Multiple Access (CDMA), or satellite link.

Various transmission protocols, data formats and conventions are known, including, for example, transmission control protocol/internet protocol (TCP/IP), hypertext transfer protocol (HTTP), secure HTTP, wireless application protocol (WAP), unique resource locator (URL), unique resource identifier (URI), hypertext markup language (HTML), extensible markup language (XML), extensible hypertext markup language (XHTML), wireless markup language (WML), and Standard Generalized Markup Language (SGML).

Interfaces coupled between the elements are also well known in the art. For simplicity, interfaces are not illustrated. An interface can be, for example, a serial port interface, a parallel port interface, a game port, a universal serial bus (USB) interface, an internal or external modem, a video adapter, or a sound card.

Computers and the programs executed on them are closely related. As used hereinafter, phrases, such as "the computer provides" and "the program provides," broadly refer to express actions by a computer that are controlled by a program.

Figure 2:
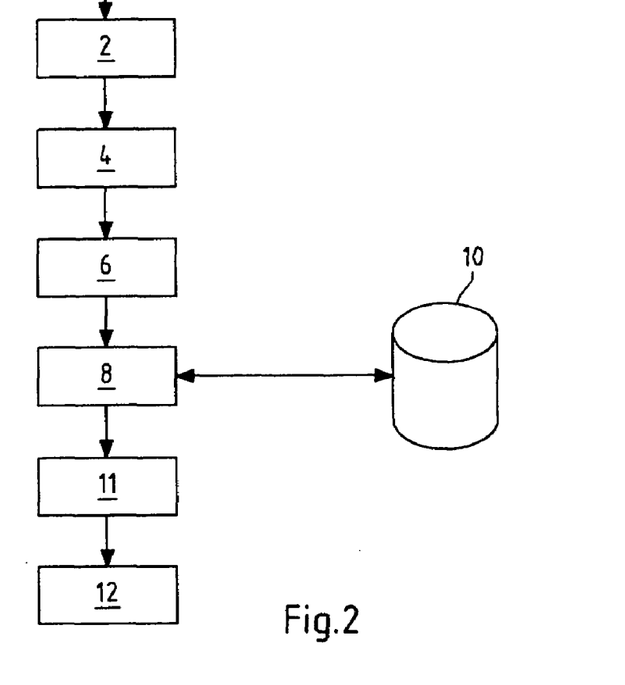
FIG. 2 illustrates a flow chart of an exemplary method according to one or more embodiments of the present invention.

FIG. 2 depicts a flow chart showing one exemplary embodiment of the present the invention. In a first step 2, the source code is read by an editing program. This typically is done by reading the source code in plain text. In FIG. 2, the source code includes the links to comments. In a second step 4, these links are extracted from the source code. The links may be marked by delimiters, identifying the links within the source code. This may be usually done by two slashes ("//"). After extracting the links in step 4, they may be analysed and storage information may be retrieved using the links.

In step 4, filter information assigned to the links may be read. This filter information may be used to determine whether the current user is allowed to execute this link. The current user may be identified by access authorisation information, which may be obtained from the user. If the access authorisation information for the current user matches this filter information for the link the link may be executed and presented. Otherwise, the link is not presented and not executed.

It is also possible that the access authorisation information is transmitted in step 6 together with the request for comments. In this case, all links are executed at first, and then, while retrieving the comments, access authorisation information is used for filtering the comments. The request for accessing the comments uses the storage information stored within the links. The links define where a comment is stored within the database.

In step 8, the access authorisation information may be extracted from the request for comments. Further, in step 8, the comments may be retrieved from the database 10. The filter information may be stored with the comment. When accessing the comment, the filter information may be read. This filter information may be compared with the retrieved access authorisation information. During comparison, it may be checked, whether certain comments may be retrieved. It may check for a match between the filter information and access authorisation information. In case the access authorisation matches the filter information, access to the particular comment may be granted and the comment may be retrieved. On the other hand, in case there is no match, the comment may not be retrieved. In such a case, a failure message may be generated. If within the filter information the access authorisation information is defined as allowable, the comment may be retrieved in step 8.

All comments retrieved and allowable to be presented may be transmitted in step 11 to the requesting computer.

After reception of the comments in the requesting computers, these comments may be presented and displayed in step 12 at the appropriate position within the source code. This position may be the position of the link for the respective comment. Given the proper conditions and configurations, all comments for a particular user may be presented in step 12 within the source code. However, the user only sees the comments which are intended to be seen. Comments which are not intended for this particular user are not displayed within the source code.

Figure 3:
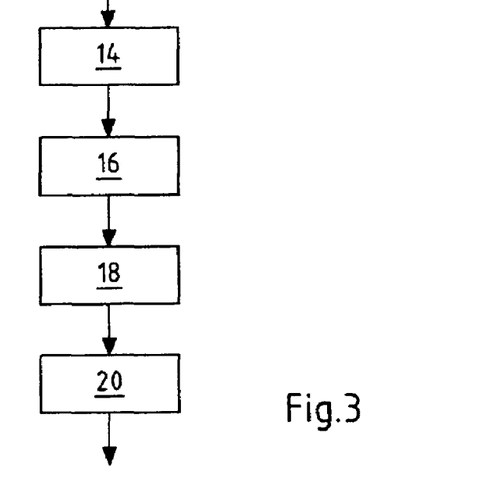
FIG. 3 illustrates a further flow chart of another exemplary method according to one or more embodiments of the present invention.

In FIG. 3, access control within step 8 is depicted more precisely. In step 14, the retrieval information may be analysed. From the retrieval information, the stored information for a comment, together with the access authorisation information, may be extracted from the request for comments.

In step 16, the access authorisation information is compared with filter information stored together with a respective comment. The filter information defines which access authorisation information enables access to a comment and also in which case access is to be denied.

In step 18, all comments which are allowed to be presented are provided. All comments are prepared to be transmitted in step 20 and then provided to step 12 of FIG. 2.

Figure 4:
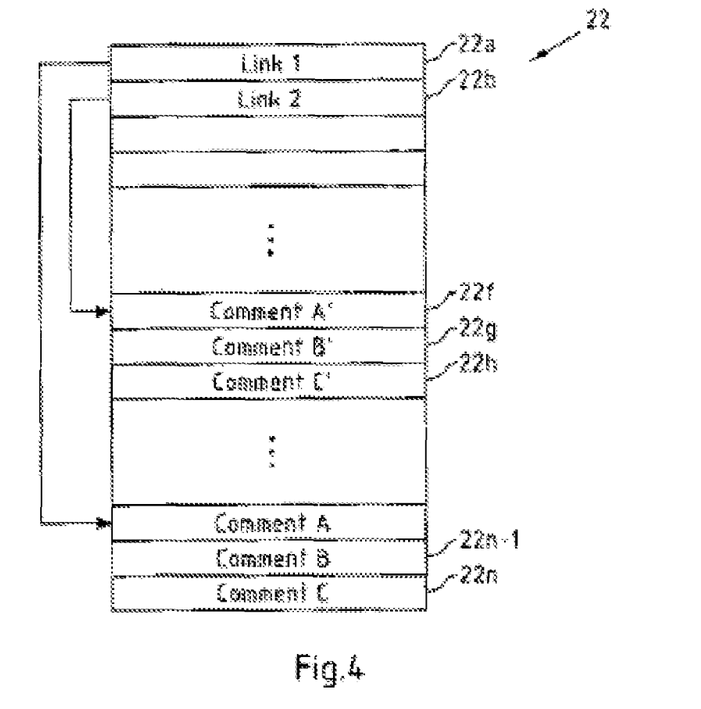
FIG. 4 illustrates an exemplary storage medium including comments according to one or more embodiments of the present invention.

FIG. 4 depicts the storage of comments within a database. As shown in FIG. 4, memory 22 comprises a plurality of memory banks 22a-22n for accessing the comments, and the links within the source code comprise access information to the comments. This access information may lead to a particular memory bank.

An exemplary storage of comments for a link 1 and a link 2 are now explained in more detail. Link 1 may comprise information pointing to memory bank 22a. Within memory bank 22a, a pointer to memory banks 22n-2-22n may be stored. When accessing the comments for link 1, this pointer is used to retrieve the comments in memory banks 22n-2-22n. Within these memory banks, three different comments, comment A, B, and C may be stored. Together with these comments, filter information may be stored. After retrieval of these comments, the filter information may be read and compared with access authorisation information. Whether the filter information matches the access authorisation information determines which comment may be used. In this case, for example, comment B has the appropriate filter information matching the access authorisation information.

In FIG. 4, link 2 within the source code provides information pointing to memory bank 22b. Within memory bank 22b, a pointer to memory banks 22f-h is stored. This pointer may be used to retrieve comments A', B' and C', which are the appropriate comments to be presented for link 2 within the source code. Also, together with these comments, filter information is stored. Depending on the access authorisation information, no comment may be presented, or the appropriate comment(s) selected from A', B' and C' may be provided and then presented within the source code.

As can be seen, for each link a plurality of comments may be stored. These comments may be used for presenting different comments for different users according to filter information.

Figure 5:
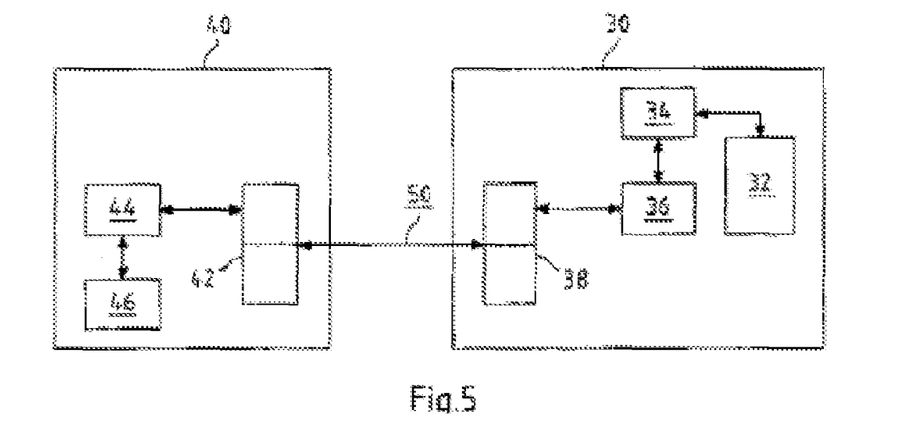
FIG. 5 illustrates an exemplary computer system according to one or more embodiments of the present invention.

FIG. 5 depicts schematically a computer system according to the invention. Depicted is an editing computer 30 and a storage computer 40. Editing computer 30 may comprise, for example, a display 32, a processor and input periphery for editing source code 34, a processor 36 for processing requests for comments, and a transceiver 38. A computer program may also be comprised in the computer system.

Storage computer 40 may comprise, for example, transceiver 42, processor 44, and storage medium 46. For accessing comments, the computer program may operate the processor 36 to retrieve links to comments from the source code using edit means 34. From these links, storage information may be retrieved, which may be processed by transceiver 38 via connection 50 to transceiver 42 of storage computer 40.

Within this message, comments may be requested. The request may be processed in processor 44 and the appropriate comment may be extracted from storage medium 46. In processor 44, filter information of this extracted comment may be read. The filter information may be compared with access authorisation information, which has been sent together with the request for comments. If the access authorisation information matches the filter information, the comment is processed to transceiver 42 and sent via connection 50 to transceiver 38. Within transceiver 38, the comment may be received and provided to processor 36. Within processor 36, the comment may be assigned to the appropriate link and, in editing means 34, the comment may be included within the source code at the appropriate position. After the comment has been included within the source code, display 32 displays the source code together with the comment.

It is intended that the specification and examples be considered as exemplary only, with a true scope and spirit of the invention being indicated by the following claims.

What is claimed is:

1. A computer-implemented method for associating one or more comments with source code, the method comprising:
    storing, in a storage, the one or more comments separately from the source code, wherein the source code comprises one or more links including storage information for obtaining the one or more comments;
    identifying where each of the one or more comments is associated with the source code; and
    enabling a provision of the one or more comments within the source code, wherein enabling the provision of the one or more comments within the source code occurs according to filter information assigned to the one or more comments and includes:
    receiving a request to access one or more links, wherein filter information is assigned to the one or more links,
    accessing the one or more links based on the received request,
    obtaining the one or more comments from the storage based on a comparison between access authorization information and the filter information assigned to the one or more links, and
    providing the one or more obtained comments, for displaying the one or more obtained comments and the source code, if the filter information matches the access authorization information.

2. The computer-implemented method of claim 1, wherein the access authorization information is obtained prior to obtaining the one or more comments from the storage, the access authorization information determining whether the one or more comments may be accessed.

3. The computer-implemented method of claim 1, wherein enabling the provision further includes:
    analyzing the access authorization information to determine which links may be accessed; and
    activating the one or more links that may be accessed.

4. The computer-implemented method of claim 1, wherein the one or more links are assigned to particular elements of the source code.

5. The computer-implemented method of claim 1, wherein displaying the one or more obtained comments together with the source code includes replacing the accessed one or more links within the source code with the one or more comments.

6. The computer-implemented method of claim 1, wherein enabling the provision further includes:
    analyzing the access authorization information to determine which links may be accessed; and displaying in the source code the one or more links that may be accessed.

7. The computer-implemented method of claim 1, wherein at least one element of the source code is associated with more than one comment one or more comments stored within the storage.

8. The computer-implemented method of claim 1, wherein enabling the provision of the one or more comments within the source code further includes:
   obtaining all the comments from the storage;
   selecting according to the filter information which comments to suppress within the source code; and
   displaying together with the source code the one or more obtained comments not selected to be suppressed.

9. The computer-implemented method of claim 1, wherein the one or more comments are stored within a database.

10. The computer-implemented method of claim 1, wherein the one or more comments include one or more language-dependent comments having language information, wherein obtaining the one or more comments includes obtaining the language information, and wherein enabling the provision of the one or more comments includes considering the language information, and wherein the provision of the one or more comments includes the provision of the one or more language-dependent comments according to the language information.

11. The computer-implemented method of claim 1, wherein the filter information includes a user role.

12. The computer-implemented method of claim 1, wherein the filter information includes a user group.

13. The computer-implemented method of claim 1, wherein the filter information includes a source code version.

14. A computer readable medium storing instructions that, when executed by a computer, causes the computer to perform a method for associating one or more comments with source code, the method comprising:
   storing the one or more comments separately from the source code, wherein the source code comprises one or more links including storage information for retrieving the one or more comments;
   identifying where each of the one or more comments is associated with the source codes;
   receiving a request to access one or more links, wherein filter information is assigned to the one or more links;
   accessing the one or more links based on the received request, obtaining the one or more comments based on a comparison between access authorization information and filter information assigned to the one or more links; and
   providing the one or more obtained comments, for displaying the one or more obtained comments and the source code, if the filter information matches the access authorization information.

15. The computer medium of claim 14, further comprising instructions operable to cause the computer to obtain access authorization information prior to obtaining the one or more comments from the storage, the access authorization information determining which of the one or more comments may be obtained.

16. The computer medium of claim 14, further comprising instructions operable to cause the computer to activate the one or more links for use, compare access authorization information with the filter information associated with a link when the link is used, and execute the link to obtain the one or more comments if the filter information matches the access authorization information.

17. The computer medium of claim 14, further comprising instructions operable to cause the computer to obtain access authorization information prior to the one or more links being used to obtain the one or more comments from the storage, the access authorization information determining whether the one or more links may be executed when accessing the one or more comments.

18. The computer medium of claim 14, further comprising instructions operable to cause the computer to associate the one or more links with particular elements of the source code.

19. The computer medium of claim 14, further comprising instructions operable to cause the computer to present the one or more comments within the source code by replacing a link within the source code with the one or more comments when the link is executed.

20. The computer medium of claim 14, further comprising instructions operable to cause the computer to obtain access authorization information prior to revealing the one or more links, the access authorization information determining whether the link is visible within the source code.

21. The computer medium of claim 14, further comprising instructions operable to cause the computer to associate at least one element of the source code with one or more comments stored within the storage.

22. The computer medium of claim 14, further comprising instructions operable to cause the computer to obtain all comments before presenting the received one or more comments within the source code, to analyze the filter information of the one or more comments to select the one or more comments to suppress, and to present within the source code the one or more obtained comments that were not suppressed.

23. The computer medium of claim 14, further comprising instructions operable to cause the computer to store the one or more comments within a database.

24. The computer medium of claim 14, wherein the one or more comments include one or more language-dependent comments, further comprising instructions operable to cause the computer to store one or more language-dependent comments having language information, to obtain the language information with the one or more language-dependent comments, to analyze the language information, and to present the one or more language-dependent comments according to the analysis of the language information.

25. A computer system for associating one or more comments with source code, the system comprising:
   a first storage medium storing the source code, wherein the source code comprises one or more links including storage information for retrieving the one or more comments;
   a second storage medium storing the one or more comments, the second storage medium being separate from the first storage medium; and
   a computer comprising a processor in communication with the first storage medium and the second storage medium; and
   a computer program having instructions operable to cause the processor to store the one or more comments separately from the source code in the second storage medium, to identify where each of the one or more comments is associated with the source code, to obtain the source code from the first storage medium, to display the source code on the computer, to receive a request to access one or more links that include filter information, to access the one or more links based on the received request, to obtain the one or more comments from the second storage medium based on a comparison between access authorization information and filter information of the one or more links, and to provide the one or more obtained comments, for displaying the one or more obtained comments and the source code, if the filter information matches the access authorization information.

26. The computer system of claim 25, wherein the computer program further includes instructions operable to cause the processor to associate filter information with the one or more comments for filtering the one or more comments.

27. The computer system of claim 25, wherein the computer program further includes instructions operable to cause the processor to compare the access authorization information prior to obtaining the comment from the second storage medium, the access authorization information determining whether the comment may be obtained.

28. The computer system of claim 25, wherein the computer program further includes instructions operable to cause the processor to use one or more links containing storage information of the one or more comments to indicate where the one or more comments belong within the source code.

29. The computer system of claim 28, wherein the one or more links are associated with filter information for filtering the one or more comments.

30. The computer system of claim 29, wherein the computer program further includes instructions operable to cause the processor to compare access authorization information with the filter information of a link, and to execute the link to obtain the one or more comments if the filter information matches the access authorization information.

31. The computer system of claim 28, wherein the computer program further includes instructions operable to cause the processor to analyze access authorization information prior to attempted execution of the one or more links to obtain the one or more comments from the second storage medium, the access authorization information determining which of the one or more links may be used to obtain the one or more comments.

32. The computer system of claim 28, wherein the one or more links are associated with particular portions of the source code.

33. The computer system of claim 28, wherein the instructions operable to cause a processor to provide the one or more obtained comments within the source code by replacing the one or more links with the one or more comments when the one or more links are executed.

34. The computer system of claim 28, wherein the computer program further includes instructions operable to cause the processor to analyze access authorization information prior to attempted execution of the one or more links to obtain the one or more comments from the second storage medium, the access authorization information determining which of the one or more links are visible when the source code is displayed.

35. The computer system of claim 25, wherein at least one portion of source code is associated with more than one comment.

36. The computer system of claim 25, wherein the computer program further includes instructions operable to cause a processor to obtain all comments before providing the received one or more comments within the source code, to analyze filter information of the one or more comments to select the one or more comments to suppress, and to provide within the source code the one or more obtained comments that were not suppressed.

37. The computer system of claim 25, wherein the second storage medium includes a database for storing the one or more comments.

38. The computer system of claim 25, wherein the one or more comments include one or more language-dependent comments having language information, and wherein the computer program further includes instructions operable to cause the processor to obtain the language information with the one or more language-dependent comments, to analyze the language information, and to provide the one or more language-dependent comments according to the analysis of the language information.

* * * * *